United States Patent [19]

Tanaka

[11] Patent Number: 4,613,549
[45] Date of Patent: Sep. 23, 1986

[54] BONDED METAL-CERAMICS COMPOSITE

[75] Inventor: Shun-ichiro Tanaka, Yokohama, Japan

[73] Assignee: Kabushiki Kaisha Toshiba, Japan

[21] Appl. No.: 702,311

[22] Filed: Feb. 15, 1985

[30] Foreign Application Priority Data

Feb. 17, 1984 [JP] Japan .................................. 59-27282

[51] Int. Cl.⁴ ............................................ B32B 15/04
[52] U.S. Cl. .................................. 428/469; 428/447; 428/698; 428/701
[58] Field of Search ................ 428/701, 469, 698, 447

[56] References Cited

U.S. PATENT DOCUMENTS

| 4,460,916 | 7/1984 | Hashimoto et al. | 428/701 X |
| 4,499,152 | 2/1985 | Green et al. | 428/901 X |
| 4,532,179 | 7/1985 | Takami et al. | 428/469 |

Primary Examiner—Thomas J. Herbert
Attorney, Agent, or Firm—Finnegan, Henderson, Farabow, Garrett & Dunner

[57] ABSTRACT

A bonded metal-ceramics composite is disclosed which has a silicon ceramics member bonded to a metal member through the medium of an oxide layer. The oxide layer consists of a crystalline phase and an amorphous phase. The metal member adheres mainly to the amorphous phase of the oxide layer, exhibiting the phenomenon of local contact in stripes or dots.

11 Claims, 2 Drawing Figures

BONDED METAL-CERAMICS COMPOSITE

BACKGROUND OF THE INVENTION

This invention relates to a bonded metal-ceramic composite.

Efforts to develop structural materials made of ceramics have been continuing in recent years. Frequently such structural materials require ceramics to be used as bonded to other materials. As means of bonding ceramics to other materials, adhesion by the use of adhesive agent and adhesion effected by metallizing ceramics as with Mo-Mn and soldering metallized ceramics to other materials have prevailed to date.

The adhesion with adhesive agent is defective in respect that structural materials produced thereby have only low working temperatures. The adhesion resorting to metallization has the disadvantage that since ceramics which are metallizable at all are limited to alumina and the like, this method cannot be applied directly to ceramics such as silicon nitride which suit production of structural materials.

SUMMARY OF THE INVENTION

This invention has issued from the efforts directed to overcoming the aforementioned drawbacks of prior art and is aimed at providing a bonded composite of silicon ceramics and metal which enjoys high bonding strength.

Specifically, this invention relates to a bonded composite of silicon ceramics and metal, which is characterized by having a silicon ceramic member bonded to a metal member through the medium of an oxide layer substantially consisting of a crystalline phase and an amorphous phase.

DETAILED DESCRIPTION OF THE INVENTION

Figure 1:
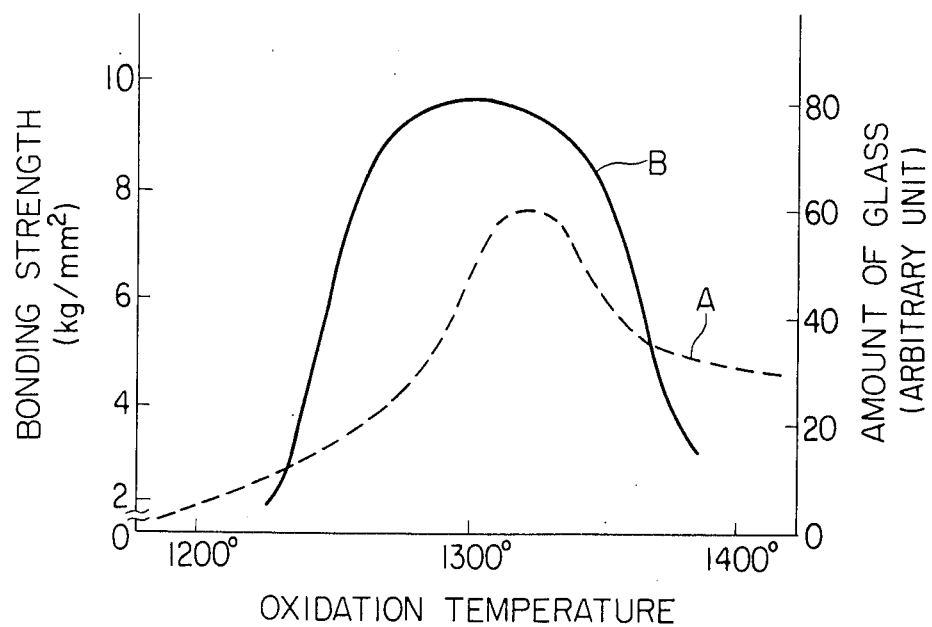
FIG. 1 is a graph showing changes brought about in glass layer and bonding strength by heating temperature and FIG. 2 is a graph showing the relation between the glass phase and the bonding strength.

This invention is based on the knowledge that a bonded metal-silicon ceramic composite is obtained by forming an oxide layer on the surface of a silicon ceramic member and then bonding a metal member to the silicon ceramic member through the medium of the oxide layer and that the bonding strength of the produced bonded composite increases in direct proportion to the amount of the amorphous phase in the oxide layer.

The term silicon ceramic "silicon ceramics" as used herein means non-oxide type silicon-containing ceramics. Examples of the silicon ceramics are $Si_3N_4$, silicon aluminum oxynitride(Si—Al—O—N), silicon oxynitride, and silicon carbonitride. Among these silicon ceramics, $Si_3N_4$ and silicon aluminum oxynitride proves particularly advantageous.

Further, silicon ceramics may contain, as a sintering additive, for example, $Y_2O_3$, $Al_2O_3$ and others. Among these sintering additives, $Y_2O_3$ proves particularly desirable. Besides the aforementioned sintering additives, silicon ceramics may contain any of alkali metals, alkaline earth metals, and transition metals. It is considered that because of their proper combination, these components manifest an effect in improving the condition of bonding of silicon ceramics to metal. Among these component, silicon ceramics are desired to contain aluminum in the form of elementary substance or a compound.

The term "oxide layer" as used herein means a layer obtained by oxidizing at least the surface of the silicon ceramic or a layer similar in composition to the aforementioned layer. For the purpose of improving the condition of adhesion of the oxide layer to the metal, the oxide layer is desired to contain therein 0.1 to 49% by weight of aluminum.

The thickness of this oxide layer is desired to fall in the range of 0.2 to 30 $\mu$m. The reason for defining the thickness is that the oxide layer acquires the highest adhesive strength when its thickness falls in this range.

The oxide layer consists of a crystalline phase and an amorphous phase and the metal member of the composite is desired to adhere mainly to the amorphous phase. The amorphous phase occupies preferably at least about 20%, more preferably at least about 50%, of the entire volume of the oxide layer.

The adhesion between the metal and the amorphous phase is desired to occur in stripes and/or dots because the adhesion in this state permits easy relief of the stress generated by the difference in thermal expansion between the metal and the ceramics.

The adhesion between the metal and the oxide layer, particularly the amorphous phase, depends on the phenomena of formation of a solid solution, formation of compound, and diffusion occurring between the metal and/or the metal oxide on the one hand and the amorphous phase on the other hand. For purposes of the present description formation of a bond by such mechanisms is termed "diffusion bonding" as all three mechanisms involve the diffusion of the various materials to form the bond. In this case, the metal and the metal oxide are desired to be eutectics.

When silicon nitride or Si—Al—O—N is selected as the silicon ceramic, the oxide layer is desired to be formed preponderantly of $\alpha$-cristobalite, $Y_2O_3.2SiO_2$, and silicate glass. Especially, the oxide layer enjoys outstanding adhesive strength when the amorphous layer thereof has silicate glass as its principal component and also contains aluminum.

Examples of the metal which can be used in this invention are copper, iron chromium, nickel, molybdenum, silver, cobalt, aluminum, alloys thereof, and mixtures thereof. The metal can be used in the form of cylinders, plates, foils, or granules. For the purpose of obtaining a satisfactory adhesion, use of copper, a copper alloy, or tough pitch copper in particular proves desirable, among other metals enumerated above.

To obtain the bonded composite of this invention, silicon ceramic, for example, is heated in air at 1200° to 1400° C. for 20 minutes to 20 hours until the layer intended for bonding is formed on the surface of the silicon ceramic. In this case, the layer formed on the surface of the silicon ceramic consists of $\alpha$-cristobalite, $Y_2O_3.2SiO_2$, and silicate glass. In the three components mentioned here, it is silicate glass that is considered to contribute most to the bonding. Also $Y_2O_3.2SiO_2$ is effective in this sense when it is in the form of thin and small crystals and these crystals are distributed in a manner such that the (110) planes of the crystals are oriented substantially parallel to the surface.

The metal is held in contact with the surface layer of the silicon ceramic so prepared and subjected in site to a thermal treatment.

When tough pitch copper is selected as the metal, for example, this thermal treatment is advantageously carried out in the atmosphere of an inert gas at a temperature in the range of 1065° to 1083° C. for one minute to two hours. In this case, the metal is desired to contain a small amount of oxygen. Otherwise, addition of a small amount of oxygen (some hundreds of ppm) to the atmosphere of heating enhances the effect of the thermal treatment.

Now, the present invention will be described more specifically below with reference to a working example. It should be noted that this invention is not limited in any sense to this example.

EXAMPLE

Pressureless sintered $Si_3N_4$ and containing 5% by weight of $Y_2O_3$, 4% of $Al_2O_3$, 3% of AlN, and 1.5% of $TiO_2$ was heated in air at 1200° to 1400° C. for about 10 hours to form on the surface thereof a layer intended for bonding with metal. When the surface of the $Si_3N_4$ mass so treated was analyzed by X-ray diffraction, it was found to contain $Y_2O_3.2SiO_2$, $\alpha$-cristobalite cristobalite, and a glass phase (silicate glass) in addition to $Si_3N_4$.

FIG. 1 shows the changes in the amount of glass phase due to the heating temperature (curve A). In this graph, the amount of glass is expressed using an arbitrary unit. This amount represents the proportion of the amount of glass phase to the entire volume of the bonding layer between the metal and the ceramic.

The $Si_3N_4$ member so produced and a tough pitch copper plate held in contact therewith were heated at 1075° C. until they were bonded to each other.

The bonded composite so produced was tested for bonding strength. The results are shown also in FIG. 1 (curve B).

From the data obtained, it is noted that the bonding layer is enabled by the presence of the glass phase to gain in bonding strength. Any excessive increase in the heating temperature is undesirable from the standpoint of strength because it goes to coarsening crystals. The produced composite acquires desirable bonding strength when the thermal treatment of the ceramic is carried out at a temperature in the range of 1250° to 1350° C.

Figure 2:
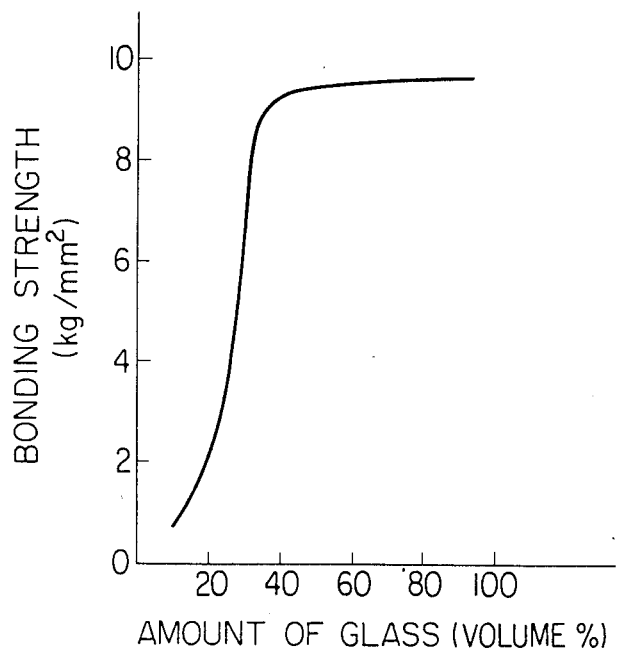

FIG. 2 is a graph obtained by plotting the data on the relation between the amount of glass and the bonding strength given in FIG. 1. From FIG. 2, it is inferred that the amount of glass contributes to the intensity of the bonding strength.

Of the samples obtained, those possessing high bonding strength were subjected to visual observation of the bonded face. In the bonded face of each sample, the metal member was found to be adhering mainly to the glass phase. The bonded surfaces showed signs of local contact in stripes or dots.

In the immediate region of contact, the metal member was composed of a eutectic of copper oxide and copper. It has been confirmed consequently that fast bonding is produced because this eutectic and the glass phase on the ceramics side interact and entail the phenomena of solid solution, formation of compound, and diffusion.

As demonstrated above, the bonded metal-ceramic composite of the present invention retains a reliable union.

What is claimed is:
1. A bonded metal-ceramic composite comprising:
    (a) a ceramic member consisting essentially of a silicon ceramic;
    (b) an oxide layer on a surface of the silicon ceramic member, the oxide layer being in the form of a crystalline phase and an amorphous phase; and
    (c) a metal member diffusion bonded to the oxide layer by diffusion of the metal within the oxide layer.
2. A bonded metal-ceramic composite according to claim 1, wherein said silicon ceramic contains aluminum.
3. A bonded metal-ceramic composite according to claim 1 or claim 2, wherein the aluminum content of said oxide layer falls in the range of 0.1 to 49% by weight.
4. A bonded metal-ceramic composite according to claim 1, wherein said metal member mainly adheres to said ceramic member through said amorphous phase.
5. A bonded metal-ceramic composite according to claim 1, wherein said metal is copper or a copper alloy.
6. The bonded metal-ceramic composite of claim 1, wherein the metal forms a compound within the oxide layer.
7. The bonded metal-ceramic composite of claim 1, wherein the metal forms a solid solution within the oxide layer.
8. A bonded metal-ceramic composite according to claim 1, wherein said silicon ceramic is selected from the group consisting of silicon nitride and silicon aluminum oxynitride.
9. A bonded metal-ceramic composite according to claim 8, wherein said silicon ceramic contains yttrium oxide as a sintering additive.
10. A bonded metal-ceramic composite according to claim 9, wherein said oxide layer is consists essentially of $\alpha$-cristobalite, $Y_2O_3.2SiO_2$ and silicate glass containing aluminum.
11. A bonded metal-ceramic composite according to claim 10, wherein the bonding between said metal member and said amorphous phase occurs in the form of local contact.

* * * * *